(12) United States Patent
Agterof et al.

(10) Patent No.: US 8,187,655 B2
(45) Date of Patent: May 29, 2012

(54) DEHYDRATION METHOD

(75) Inventors: Wilhelmus G. M. Agterof, Woerden (NL); Rajni Bhatia, Blackheath (GB); Gerard W. Hofland, Hooqmade (NL)

(73) Assignee: Feyecon Development & Implementation B.V., Weesp (NL)

( * ) Notice: Subject to any disclaimer, the term of this patent is extended or adjusted under 35 U.S.C. 154(b) by 753 days.

(21) Appl. No.: 11/629,699

(22) PCT Filed: Jun. 16, 2005

(86) PCT No.: PCT/NL2005/000439
§ 371 (c)(1),
(2), (4) Date: Feb. 11, 2008

(87) PCT Pub. No.: WO2005/122776
PCT Pub. Date: Dec. 29, 2005

(65) Prior Publication Data
US 2010/0260891 A1    Oct. 14, 2010

(30) Foreign Application Priority Data

Jun. 16, 2004  (EP) .................................... 04076777

(51) Int. Cl.
*A23B 5/02*    (2006.01)
(52) U.S. Cl. .......... 426/465; 426/312; 426/425; 34/330; 34/341; 34/413
(58) Field of Classification Search ............. 34/329, 34/330, 339, 340, 341, 523, 357, 358, 443, 34/467; 426/312, 318, 319, 443, 426, 465, 426/489, 425
See application file for complete search history.

(56) References Cited

U.S. PATENT DOCUMENTS

| | | | |
|---|---|---|---|
| 2,592,038 A * | 4/1952 | Kimsey | ........................... 62/284 |
| 4,167,589 A   | 9/1979 | Vitzthum et al. | |
| 4,335,150 A * | 6/1982 | Hosaka et al. | ................. 426/465 |
| 5,026,565 A   | 6/1991 | McLachlan et al. | |
| 5,151,188 A * | 9/1992 | Hopper et al. | ................. 210/634 |
| 6,110,518 A * | 8/2000 | Cooper et al. | ................. 426/385 |
| 6,268,012 B1* | 7/2001 | Sikora et al. | ................... 426/640 |

OTHER PUBLICATIONS

Quebe et al, 92B-24 Drying pasta using supercritical fluids, 2003 Annual Meeting, Oct. 27, 2003.*
USDA National Nutrition Database Release 16, No month 2003.*
Bailey et al, Supercritical Fluid Extraction of Muscle Food Lipids for Improved Quality, in Food Flavor and Safety; May 1993.*

* cited by examiner

*Primary Examiner* — C. Sayala
*Assistant Examiner* — Walter Moore
(74) *Attorney, Agent, or Firm* — Gilberto M. Villacorta; Sunit Talapatra; Foley & Lardner LLP

(57) ABSTRACT

The present invention relates to a method of dehydrating pieces of intact plant or animal tissue, said pieces containing at least 30 wt. % of water, the method comprising (i) contacting the pieces of intact tissue with a pressurized gas to reduce the water content of the pieces by at least 50%, said pressurized gas having a pressure of at least $0.5 \times P_c$ and a temperature of at least $T_c - 60°$ C., $P_c$ representing the critical pressure of the gas and $T_c$ representing the critical temperature of the gas, and (ii) separating the pressurized gas from the dehydrated pieces, wherein at least 80 wt. %, preferably at least 90 wt. % of the matter removed by the gas from the pieces of intact plant or animal tissue is water. The invention also provides a method of dehydrating a material containing at least 30 wt. % of water, using a method as described before, followed by drying the separated pressurized gas by contacting said pressurized gas with a water absorbent water adsorbent; and recirculating the dried pressurized gas to the partially dehydrated material.

20 Claims, No Drawings

DEHYDRATION METHOD

TECHNICAL FIELD OF THE INVENTION

The present invention relates to a method of dehydrating pieces of intact plant or animal tissue, such as fruits, vegetables, meat, shellfish or parts thereof. The dehydrated pieces obtained by the present method are capable of essentially instant, substantially uniform reconstitution upon the addition of water. Furthermore, the rehydrated pieces obtained after reconstitution exhibit an appearance and structure that is very similar to that of the original pieces.

The present invention also provides a method of dehydrating a material comprising (i) contacting said material with an extraction solvent to reduce the water content of the material; (ii) separating the solvent from the partially dehydrated material; (iii) drying the solvent thus obtained by contacting said solvent with a water absorbent or adsorbent; and (iv) recirculating the dried solvent to the partially dehydrated material.

BACKGROUND OF THE INVENTION

It is well known in the art of food processing to dehydrate food materials, e.g. vegetables, to prevent decay and/or to reduce weight. Prior to consumption such dehydrated materials are to be reconstituted with water so as to restore the appearance and eating qualities (flavour, texture etc.) of the original (fresh) food material.

Prior art endeavors in this field have resorted to rather severe dehydration treatments (e.g. hot air drying) of the fresh product and/or to complex treatments of the product (e.g. freeze drying) and in some instances to the use of chemical treatments. The adverse impact of such processes on a number of characteristics of the fresh starting material is well known. For instance, hot air drying will usually have a significant adverse effect on the flavour and the colour of the fresh starting material. Also, hot air dried products generally do not rehydrate well. Freeze drying typically yields dehydrated products that are superior to hot air dried products in terms of flavour and colour. However, freeze drying is known to cause rupture of cells and to increase the permeability of vegetables to water. Furthermore, freeze drying is not particularly economical as it is a very slow process that consumes a lot of energy.

In short, the prior art has long recognised a need for a simple, effective method for preserving the fresh characteristics of pieces of intact plant or animal tissue. In addition there is a general need for an economical dehydration method that does not adversely affect the desirable characteristics of the starting material as a result of e.g. heat induced or oxidative damage.

SUMMARY OF THE INVENTION

Unexpectedly, the present inventors have found that it is possible to dehydrate pieces of intact plant or animal tissue whilst retaining the fresh characteristics by using a pressurised gas having a pressure of at least $0.5 \times P_c$ and a temperature of at least $T_c-60°$ C., $P_c$ representing the critical pressure of the gas and $T_c$ representing the critical temperature of the gas. More particularly, it was found that dehydration by means of pressurised gas yields dehydrated pieces that, after rehydration, exhibit qualities associated with freshness such as natural appearance, flavour, texture and product integrity. At the same time the shelf-life of the dehydrated product is appreciably extended as compared to the untreated product. Furthermore, the dehydrated pieces obtained by the present method rehydrate quickly and easily.

Although the inventors do not wish to be bound by theory it is believed that the aforementioned benefits of the present method are associated with the fact that the cellular structure of the tissue remains undamaged throughout the dehydration process. Furthermore, the present process can suitably be operated at relatively low temperatures (e.g. ambient temperature). Thus, the detrimental effects of heat exposure can also be avoided.

The inventors have also discovered that liquefied gas or supercritical gas may advantageously be used to dehydrate water containing materials, particularly materials that contain components that are heat sensitive or that are prone to oxidation. Hot air drying of such materials will cause significant quality loss whereas freeze drying often is not economical. When using pressurised gas to dehydrate these water containing materials, it is highly advantageous to recirculate the pressurised gas across the water containing material and water absorbent or water adsorbent so as to avoid saturation with water.

U.S. Pat. No. 5,026,565 describes a process for the removal of sterols and/or lipid components from lipid containing food using sub or super-critical fluids. It is noted in the U.S. patent that after a particle reduction step, sub or supercritical fluid is used to remove water. Upon reaching a certain moisture content, fat and cholesterol will also be extracted. It is said that the meat should be dried to the range 30-55% w/w. The examples of the U.S. patent show that significant water removal is accompanied by the extraction of substantial amounts of fat.

DETAILED DESCRIPTION OF THE INVENTION

Accordingly, one aspect of the present invention relates to a method of dehydrating pieces of intact plant or animal tissue, said pieces containing at least 30 wt. % of water, the method comprising (i) contacting the pieces of intact tissue with a pressurised gas to reduce the water content of the pieces by at least 50%, said pressurised gas having a pressure of at least $0.5 \times P_c$ and a temperature of at least $T_c-60°$ C., $P_c$ representing the critical pressure of the gas and $T_c$ representing the critical temperature of the gas, and (ii) separating the pressurised gas from the dehydrated pieces, wherein at least 80 wt % of the matter removed by the pressurised gas from the pieces of intact plant or animal tissue is water.

The term "intact" as used herein in relation to plant or animal tissue means that said tissue is essentially undamaged (although it may have been submitted to e.g. blanching), meaning that the individual cells have not been ruptured and are still interconnected. Thus, tissue that has been subjected to a mashing or grinding operation, as is frequently employed as pre-treatment to drying or extraction, is not regarded as intact tissue. The terminology "pieces of intact plant or animal tissue" encompasses parts of plant or animal tissue that have been removed by cutting, or equivalent techniques, as the tissue within the pieces thus obtained will remain essentially intact.

The term "gas" as used herein refers to a substance or element, or to a mixture of substances and/or elements that is/are gaseous at a pressure of 1 atmosphere and a temperature of 20° C. and that can be brought into a liquid or supercritical state by increasing pressure to at least 10 atmosphere, preferably to at least 20 atmosphere.

The benefits of the present invention are particularly pronounced in case the method is employed to dehydrate relatively large pieces of intact tissue. Consequently, in a particularly preferred embodiment of the invention, at least 50% (v/v) of the pieces to be dehydrated have a weight of at least 0.05 g, preferably of at least 0.1 g and most preferably of at least 0.3 g.

Typical examples of pieces of intact plant tissue that may advantageously be dehydrated by the present method include vegetables, fruit, herbs, spices as well as parts of these plant materials and any possible blends thereof. Preferably, the present method is employed to dehydrate vegetables (including legumes) and fruit. Examples of pieces of animal tissue that can suitably be dehydrated by the present method include shellfish, shrimps, beef, pork, chicken and fish meat.

An important benefit of the present method is associated with the excellent rehydratability of the dehydrated pieces obtained therefrom. A measure of said dehydratability is the so called rehydration ratio. The rehydration ratio is defined as the ratio of the weight of the reconstituted product after 5 minutes of rehydration to the weight of the dehydrated product prior to rehydration. Typically, the rehydration ratio of the dehydrated pieces obtained from the present method exceeds 3. Preferably, the aforementioned rehydration ratio exceeds 3.5, more preferably it even exceeds 4.

Another measure of the rehydratability of the dehydrated pieces is the rehydration capacity. The rehydration capacity is defined as the quotient of (a) the mass of the rehydrated pieces minus the mass of the dried material and (b) the mass of the fresh material minus the mass of the dried material. Again, the mass of the rehydrated pieces is determined after 5 minutes of rehydration.

The rehydration capacity is particularly suitable for defining the rehydratability of dehydrated pieces that were obtained from pieces of tissue with a relatively low moisture content (e.g. 40-75 wt. %). Meat tissue typically has a much lower moisture content than most plant tissues, which is why the rehydration capacity is more suited for defining the rehydratability of dehydrated meat pieces. Typically, the rehydration capacity of the dehydrated pieces obtained from the present method exceed 0.3. More preferably, the rehydration capacity exceeds 0.33, most preferably said ratio exceed 0.35.

Typically, the dehydrated pieces obtained by the present method contain less than 20 wt. % of water, preferably less than 10 wt. % of water. The water activity of the dehydrated pieces obtained by the present method is advantageously below 0.6, especially below 0.3.

As compared to, for instance, freeze drying, the present method offers the advantage that the achievable dehydration rate is significantly higher. In the present method the pieces of intact plant or animal tissue are typically contacted with the pressurised gas for at least 30 minutes so as to achieve a substantial reduction in moisture content. Depending on the moisture content of the starting material and the size of the pieces, adequate dehydration can usually be achieved in 1-12 hours.

Typically, the solubility of water into pressurised gas is rather low. Thus, in order to avoid the use of large quantities of pressurised gas, it is preferred to recirculate the pressurised gas across a means that is capable of removing the extracted water. Therefore, in a particularly preferred embodiment, following the separation of the pressurised gas, said pressurised gas is dried by removal of water contained therein and the dried pressurised gas thus obtained is recirculated to the pieces of intact plant or animal tissue. By selectively removing water from the pressurised gas the extraction of components other than water may be minimised effectively. Especially if a relatively low volume of pressurised gas is used, said gas will quickly become saturated with extractables other than water, following which further extraction of these extractables will be minimal.

The water may be removed from the recirculated pressurised gas by any means known in the art. The extracted water may be recovered, for instance, by reducing the pressure and/or temperature of the gas so as to substantially decrease the solubility of water therein. Alternatively, in a preferred embodiment, the water is removed from the pressurised gas by contacting the gas with a water adsorbent or a water absorbent that is immiscible with said pressurised gas. The water adsorbent or absorbent may be a liquid or solid, preferably particulate, material. Examples of suitable adsorbents and absorbents include activated silicates, including activated clays and aluminosilicates; inorganic salts (e.g. calcium chloride, sodium bicarbonate, sodium carbonate and calcium sulphate); superabsorbent polymers (especially polyacrylates; acrylate copolymers, chitosan salts and surfactant-treated polyolefins, e.g. surfactant-treated polypropylene); cellulose, starch and modified starches. It is noted that cellulose and starch may suitably be employed in the form of a natural organic materials, e.g. corncob, paper, cotton, cork, peat or straw.

According to a particularly preferred embodiment, the water is removed from the pressurised gas by contacting the gas with activated silicates, especially microporous silicates (aluminosilicates such as Zeolite 3A and 4A being particularly preferred), as these silicates are capable of selectively removing water whilst not extracting larger molecules, e.g. flavour molecules, from the pressurised gas. Thus, extraction of (desirable) components from the plant or animal tissue other than water is effectively minimised.

The applied amount of water absorbent and/or water adsorbent material may suitably be used to control the amount of water that is removed from the pieces of intact plant or animal tissue. Once the water removing capacity of the water absorbent or water adsorbent material has been exhausted, no water will be extracted anymore. Consequently, it may be calculated how much absorbent/adsorbent is needed to remove a predetermined amount of water.

The efficacy of the present process may suitably be controlled by continuously monitoring the moisture content of the recirculating pressurised gas. For instance, if the moisture of the gas that has been contacted with the pieces of plant or animal tissue drops below a certain preset value, this can be used as an indicator that the process may be discontinued. Furthermore, if the moisture content of the gas had been passed through/over a water absorbent or water adsorbent exceeds another preset value, this may indicate that the circulation flow should be reduced and/or that the water adsorbent or water absorbent material needs to be replaced or regenerated.

It may be advantageous to vary the drying rate at different stages of the present process so as to optimise the quality of the dehydrated pieces. The drying rate may be controlled by removing or adding water absorption/adsorption material (whilst maintaining pressure) and/or by changing the circulation flow rate and/or by diverting a part of the flow so it will pass the water absorbent/adsorbent material. According to a preferred embodiment, the present process employs a high initial flow rate of pressurised gas which is gradually reduced as the moisture extraction progresses. Typically, the flow rate employed in the present process is at least 5 litres per hour per 100 g of starting material (pieces of intact plant or animal tissue).

In an advantageous embodiment of the present method the pressurised gas is percolated across a bed of the pieces of intact plant or animal tissue. The bed may suitably consist of a single mass of pieces that have been piled up or heaped together. It may also be advantageous to employ a vertical arrangement of two or more screens onto each of which a layer of the pieces has been deposited. Alternatively, a horizontal arrangement is used, especially if it should be avoided that water adhered to pieces will drop onto lower positioned pieces, e.g. because this can give rise to discolouration. In the present method the dehydrated pieces are suitably separated from pressurised gas prior to adjusting the pressure and temperature to ambient conditions. The adjustment of the pressure and temperature preferably occurs at a sufficiently slow rate to leave the tissue cell structure essentially intact. More particularly, the pressure is advantageously decreased at a rate of not more than 10,000, especially not more than 7,500 Pa/s.

The present invention also provides a method of dehydrating a material containing at least 30 wt. % of water, the method comprising (i) contacting said material with a pressurised gas to reduce the water content of the material; (ii) separating the pressurised gas from the partially dehydrated material; (iii) drying the pressurised gas thus obtained by contacting said pressurised gas with a water absorbent or water adsorbent; and (iv) recirculating the dried pressurised gas to the partially dehydrated material, wherein the water content of the composition is reduced by at least 50%. As explained before, by continuously removing water from the recirculating pressurized gas, extraction of components other than water may be minimized very effectively.

The present dehydration method suitably employs a pressure during contacting of the pieces with the pressurised gas that is close to the critical pressure of the pressurised gas. Preferably, the pressure of the pressurised gas is at least $0.7 \times P_c$. Even more preferably the pressure of the pressurised gas is at least $0.8 \times P_c$. Usually the pressure of the pressurised gas will not exceed $10 \times P_c$, preferably it will not exceed $5 \times P_c$.

The temperature of the pressurised gas during the contacting with the pieces of plant or animal tissue advantageously is at least $T_c - 40°$ C. Even more preferably said temperature is at least $T_c - 30°$ C. In a preferred embodiment the temperature of the pressurised gas does not exceed $T_c + 60°$ C., more preferably it does not exceed $T_c + 40$ C. within the same to equipment, preferably without removing the pieces of plant or animal tissue from the equipment until after the extraction has been completed.

Another aspect of the invention relates to the use of a pressurised gas for dehydrating pieces of intact plant or animal tissue containing at least 30 wt % of water to obtain dehydrated pieces having a rehydration ratio exceeding 3, said pressurised gas having a pressure of at least $0.5 \times P_c$ and a temperature of at least $T_c - 60°$ C.

The invention is further illustrated by means of the following examples.

EXAMPLES

Example 1

Drying Broccoli in Batch without Circulation

Experimented Procedure

Experiments were performed in a 1-litre pressure vessel that can be heated or cooled by means of a jacket filled with oil. In the experiments, the vessel was filled with 500 g zeolite type 3A (J.T.Baker®). On the zeolite a maze was placed and on top of this the 65 g of broccoli pieces were deposited wrapped in polyester cloth. Prior to the experiment, the broccoli was defrosted and weighed. Liquid carbon dioxide (65 bar) was introduced into the vessel to such a level that both the broccoli and the zeolite were submersed. The jacket temperature was set to the desired temperature (22° C.). The extraction was continued for 16 h. Subsequently, the $CO_2$ was removed from the vessel via a valve mounted at the bottom of the vessel. After pressure release, the vessel was opened and the broccoli was weighted to determine the loss of the mass.

Results

After treatment with liquid carbon dioxide as described above the weight of the broccoli was found to have been reduced by 85%.

Example 2

Drying Broccoli in Batch with Circulation

Two experiment were performed in a 6 litre vessel which was continuously flushed with $CO_2$ during the dehydration process by means of a circulation pump. As described in Example 1, ca. 70 g broccoli was deposited—wrapped in polyester cloth—on top of a maze which was placed on top of a bed of 700 g zeolite 3A. The $CO_2$ was flushed from the bottom upwards. The vessel was heated with oil via a jacket. The procedure employed was identical to that described in the previous example, except that during the dehydration, the circulation pump was switched on to improve the drying rate. The conditions employed during the experiments and the results so obtained are summarised in the following table:

|   | Weight ratio Broccoli/zeolite | P (bar) | T (° C.) | Extr. time (h) | Weight reduction | Moisture content | Water activity | Rehydr capac. | Rehydr ratio |
| --- | --- | --- | --- | --- | --- | --- | --- | --- | --- |
| 1 | 0.09 | 80 | 28 | 10 | 90% | 11.2% | 0.470 | 0.48 | 5.37 |
| 2 | 0.10 | 140 | 43 | 7 | — | 8.7% | 0.479 | 0.65 | 7.13 |

Example 3

Drying Fresh Broccoli in Separate Vessels

Fresh broccoli was cut to pieces with sizes of 1-2 cm. The pieces were blanched for 90 sec. Adhered water was removed via adsorption on paper cloth. The broccoli was placed on four trays and placed in a first vessel. The vessel wall was equipped with electrical heating wire. Zeolite 3A was placed into a second vessel in a cotton holder. The second vessel was equipped with a jacket through which heated water was flushed in order to warm the vessel and contents. The second vessel was connected via the bottom and a valve to the first vessel. The first vessel was connected via the bottom to the inlet of a circulation pump. The outlet of the first vessel was connected to the top of the second vessel, via a valve. In the tube connecting the first vessel and the circulation pump, a liquid trap was placed to remove liquid water during the process. Between the liquid trap and the circulation pump, a sensor was placed to measure the relative humidity in the carbon dioxide. Also connected to the second vessel was a connection to add carbon dioxide.

The method involved adding carbon dioxide to the second vessel via a double tube cooler and a membrane pump, allowing the second vessel and contents to warm to 40° C. Next, the connections to the second vessel and circulation pump were opened. Carbon dioxide was added until a pressure of 100 bar was reached. Carbon dioxide was circulated over the zeolite and the broccoli. The humidity sensor was used as an indication of the required duration of the process and the required circulation rate. After 6 hours, the circulation pump was stopped and the pressure was released in 0.5 hour. The broccoli was packed in air-tight bags for analysis.

Analysis revealed that the water activity of the dried broccoli was 0.33 and that the rehydration capacity was 0.59 and the rehydration ratio 6.68.

Example 4

Drying of Other Vegetables and Fruits

In a similar way as described in example 3, other vegetables and fruits were dried. These were apple parts, leek and red pepper (paprika). The leek was blanched for 90 sec before drying. The drying conditions were 100 bar and 39° C. The drying time was 8 h. The pressure was released to atmospheric in 0.5 h.
The weight loss and water activity were measured.

|  | Weight loss | Aw |
| --- | --- | --- |
| Appel | 86.3% | 0.439 |
| Leek | 91.1% | 0.499 |
| Paprika | 90.4% | 0.573 |

Example 5

Drying of Herbs

In experiments similar to that described in example 2, fresh herbs (parsley, chives) were dried. Instead of a 6 litre vessel, a smaller vessel was used (1 litre) to minimize the loss of volatiles. The pressure during drying was 100 bar, the temperature was 40° C. The drying time was 5 hours. The pressure was released to atmospheric in half an hour. Amounts of 7.8 g and 5.4 g of parsley were dried. The ratio zeolite to herbs was 30:1. The final water content reduced from 88% to 3% (w/w) in case of parsley. In case of chives it was reduced from 89% to 7% (w/w).

Example 6

Drying of Meat

In experiments similar to those described in example 4, meat parts (5-10 mm) were dried. The drying time was 21 hours. The temperature was 38° C., the pressure was 100 bar. The ratio zeolite to meat was 10:1. Dried were pork chop, beef and fillet of chicken. The weight loss was measured. In addition, the water content and fat content, the rehydration capacity and rehydration ratio were determined. Results are shown in table below

|  | Weight loss | Water content | | Fat content | | Re-hydration capacity | Rehydration ratio |
| --- | --- | --- | --- | --- | --- | --- | --- |
|  |  | Initial | Final | Initial | Final |  |  |
| Pork | 69% | 72% | 9.0% | 4.2% | 4.0% | 0.44 | 2.1 |
| Beef | 70% | 74% | 6.7% | 2.5% | 2.6% | 0.37 | 1.9 |
| Chicken | 69% | 73% | 12% | — | — | 0.44 | 2.0 |

The invention claimed is:

1. A method of dehydrating intact plant or animal tissue or pieces thereof, said tissue containing at least 30 wt. % of water, the method comprising: (i) contacting the intact tissue with a pressurised gas to reduce the water content of the tissue by at least 50%, said pressurised gas having a pressure of at least 0.5×P, and a temperature of at least $T_c$-60° C., $P_c$ representing the critical pressure of the gas and $T_c$ representing the critical temperature of the gas, (ii) separating the pressurised gas from the dehydrated tissue, (iii) drying the pressurised gas by removal of water contained therein, and (iv) recirculating the dried pressurised gas to the intact plant or animal tissue, wherein the dehydrated tissue contain less than 20 wt. % water and at least 80 wt. % of the matter removed by the pressurised gas from the intact plant or animal tissue is water and, wherein the dehydrated tissue has a rehydration ratio of greater than 3.

2. The method according to claim 1, wherein at least 50% (v/v) of the tissue to be dehydrated has a weight of at least 0.05 g.

3. The method according to claim 1, wherein the dehydrated tissue has a water activity below 0.6.

4. The method according to claim 1, wherein the intact plant or animal tissue are contacted with the pressurised gas for at least 30 minutes.

5. The method according to claim 1, wherein the water is removed from the pressurised gas by contacting the gas with a water absorbent.

6. The method according to claim 1, wherein the water absorbent is immiscible with said pressurised gas.

7. The method according to claim 1, wherein the pressurised gas is a liquefied or supercritical gas.

8. The method according to claim 1, wherein the gas is selected from the group consisting of carbon dioxide, nitrous oxide, ethane, ethylene, propane, cyclopropane, propylene, butane and mixtures thereof.

9. The method according to claim 8, wherein the pressurised gas is carbon dioxide.

10. The method according to claim 9, wherein the carbon dioxide is at a pressure of at least 40 bar and a temperature between 0° and 200° C.

11. The method according to claim 1, wherein pressurised gas has a water content below 0.1 wt. %.

12. The method according to claim 1, wherein the dehydrated tissue contain less than 10 wt. % water.

13. The method according to claim 12 further comprising (iii) submitting the dehydrated material to an extraction with the pressurised gas, wherein the extraction removes at least 1% of lipophilic material by weight of dry matter contained in the said tissue.

14. The method according to claim 1, wherein the gas is selected from the group consisting of carbon dioxide, nitrous oxide, ethane, ethylene propane, cyclopropane, propylene, butane and mixtures thereof.

15. The method according to claim 14, wherein the pressurised gas is carbon dioxide at a pressure of at least 40 bar, and a temperature between 0° and 200° C.

16. A method of dehydrating intact plant or animal tissue or pieces thereof, said tissue comprising at least 30 wt. % of water, the method comprising (i) contacting said material with a pressurised gas to reduce the water content of the material, said gas having a pressure of at least $0.5 \times P_c$ and a temperature of at least $T_c$-60° C.; (ii) separating the pressurised gas from the partially dehydrated material; (iii) drying the pressurised gas thus obtained by contacting said pressurised gas with a water absorbent or water adsorbent; and (iv) recirculating the dried pressurised gas to the partially dehydrated material, wherein the water content of the material is reduced by at least 50%, and wherein the dehydrated tissue has a rehydration ratio of greater than 3.

17. The method according to claim 16, wherein the pressurised gas is a liquefied or supercritical gas.

18. The method according to claim 16, wherein the pressurised gas has a water content below 0.1 wt. %.

19. The method according to claim 16, wherein the water content of the material is reduced to less than 10%.

20. The method according to claim 19 further comprising (v) submitting the dehydrated material to an extraction with the same gas, said gas being in a pressurised state, wherein the extraction removes at least 1% of lipophilic material by weight of dry matter contained in the said material.

* * * * *